(12) United States Patent  (10) Patent No.: US 11,332,584 B2
Wu et al.  (45) Date of Patent: May 17, 2022

(54) ANISOTROPIC CONDUCTIVE FILM, DISPLAY PANEL, AND MANUFACTURING METHOD THEREOF

(71) Applicant: Shenzhen China STAR OPTOELECTRONICS SEMICONDUCTOR DISPLAY TECHNOLOGY CO., LTD., Guangdong (CN)

(72) Inventors: Haoxu Wu, Guangdong (CN); Jincheng Li, Guangdong (CN); Yuan Mei, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 316 days.

(21) Appl. No.: 16/618,980

(22) PCT Filed: Nov. 4, 2019

(86) PCT No.: PCT/CN2019/115335
§ 371 (c)(1),
(2) Date: Dec. 3, 2019

(87) PCT Pub. No.: WO2021/012452
PCT Pub. Date: Jan. 28, 2021

(65) Prior Publication Data
US 2021/0340333 A1  Nov. 4, 2021

(30) Foreign Application Priority Data
Jul. 25, 2019  (CN) .......................... 201910679118.4

(51) Int. Cl.
*C08G 83/00* (2006.01)
*C08J 5/18* (2006.01)
(Continued)

(52) U.S. Cl.
CPC ................. *C08G 83/00* (2013.01); *C08J 5/18* (2013.01); *G09F 9/301* (2013.01); *H01B 1/122* (2013.01); *H01R 4/04* (2013.01); *G02F 1/0107* (2013.01)

(58) Field of Classification Search
None
See application file for complete search history.

(56) References Cited

U.S. PATENT DOCUMENTS

2017/0271299 A1  9/2017  Li et al.

FOREIGN PATENT DOCUMENTS

| CN | 105493204 A | 4/2016 |
| CN | 105974695 | * 9/2016 |

(Continued)

OTHER PUBLICATIONS

Lingling Wang, et al.; "A highly soluble, crystalline covalent organic framework compatible with device implementation", Chemical Science 10(4), Jan. 2019, pp. 1023-1028.

*Primary Examiner* — Ashok Patel

(57) ABSTRACT

The present disclosure provides an anisotropic conductive film, a display panel, and manufacturing method thereof. The anisotropic conductive film includes a conductive particle, the conductive particle including a covalent organic framework material, the covalent organic framework material including PyVg-COF. The display panel including a first substrate, a second substrate and an anisotropic conductive film. The method of manufacturing the display panel including: providing a first substrate, coating an anisotropic conductive film on the first substrate, coupling the second (Continued)

substrate to the first substrate, and bonding the first substrate to the second substrate. The present disclosure provides the conductive particles of the covalent organic frame material replace the existing gold ball as an anisotropic conductive film for bonding, thereby saving the manufacturing cost of the gold ball, improving the conductivity and water resistance, and avoiding the bonding contact point being oxidation.

9 Claims, 1 Drawing Sheet

(51) Int. Cl.
  *G09F 9/30* (2006.01)
  *H01B 1/12* (2006.01)
  *H01R 4/04* (2006.01)
  *G02F 1/01* (2006.01)

(56) References Cited

FOREIGN PATENT DOCUMENTS

| | | |
|---|---|---|
| CN | 105974695 A | 9/2016 |
| CN | 106653808 A | 5/2017 |
| CN | 109851807 A | 6/2019 |
| CN | 110003026 A | 7/2019 |
| JP | 2017057299 A | 3/2017 |

\* cited by examiner

ANISOTROPIC CONDUCTIVE FILM, DISPLAY PANEL, AND MANUFACTURING METHOD THEREOF

FIELD OF INVENTION

The present disclosure relates to the field of display technologies, and more particularly to an anisotropic conductive film, a display panel, and manufacturing method thereof.

BACKGROUND OF INVENTION

In the field of display technology, a connect portion between a display panel and a driver chip requires a signal input through an anisotropic conductive film. A conventional anisotropic conductive film is formed from coating a gold ball mixed rubber material, and then thermally cured to form a film. However, requirements of the golden ball manufacturing process and the material cost are high. Therefore, it is urgent to provide a new anisotropic conductive film, a display panel and manufacturing method thereof to solve the above problems.

SUMMARY OF INVENTION

An object of the present disclosure is to provide an anisotropic conductive film for bonding, a display panel, and manufacturing method thereof, the conductive particles of the covalent organic frame material replace the existing gold ball as an anisotropic conductive film for bonding, thereby saving the manufacturing cost of the gold ball, improving the conductivity and water resistance, and avoiding the bonding contact point being oxidation.

To solve the above problems, an embodiment of the present disclosure provides an anisotropic conductive film, includes a conductive particle, the conductive particle including a covalent organic framework material, the covalent organic framework material including PyVg-COF.

Further, the covalent organic framework material is PyVg-COF, and structural formula of PyVg-COF is as follows:

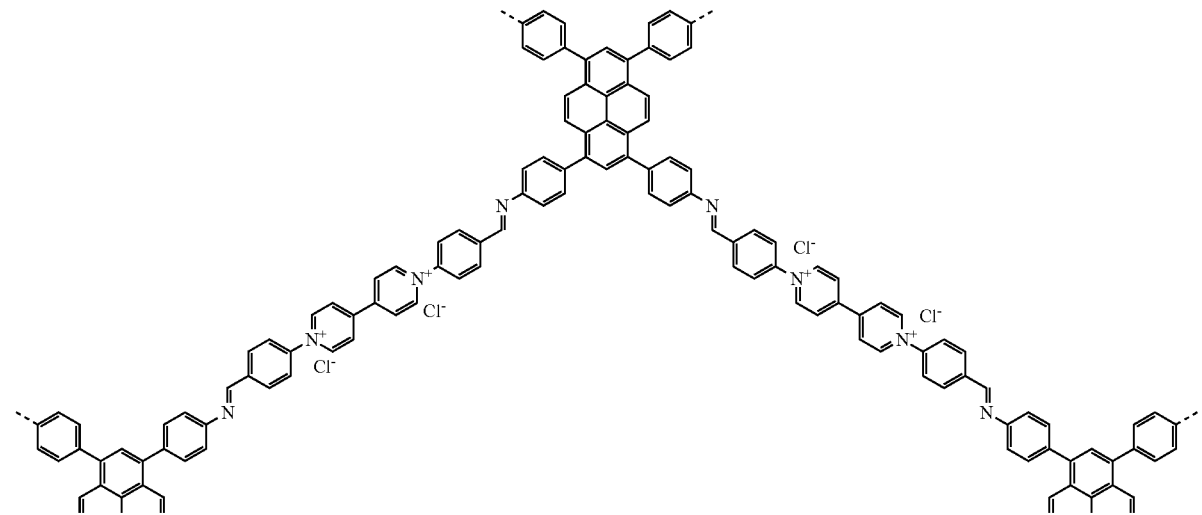

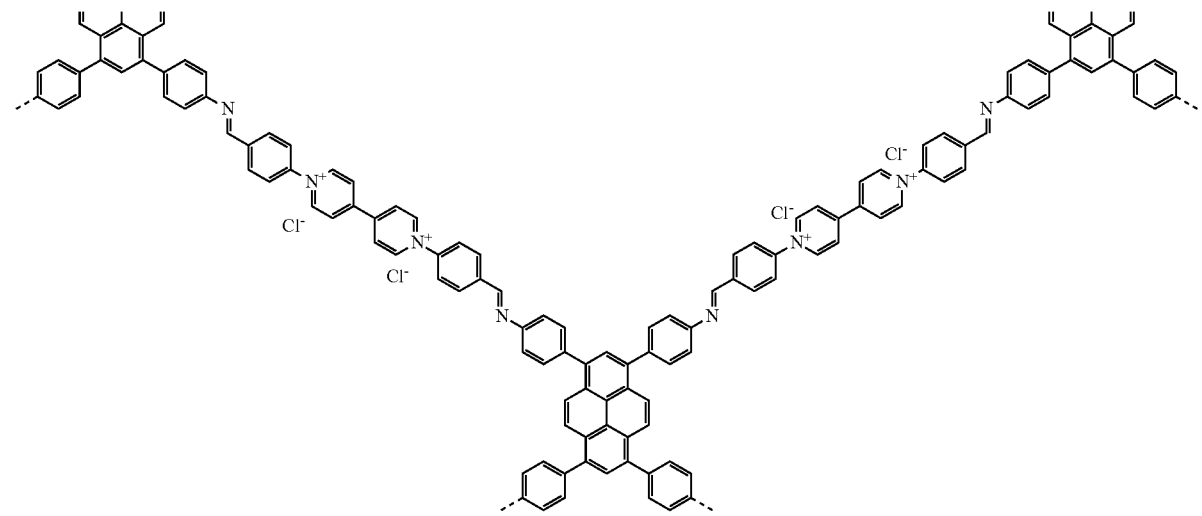

Further, the anisotropic conductive film further includes a solvent, a binder, and an additive.

Further, the solvent includes poly(methyl methacrylate), dimethylacetamide, pyrrolidone, N,N-diethyl formamide, dimethyl sulfoxide, or combinations thereof.

Further, the binder comprises a vinyl acetate resin, an acrylic resin, an epoxide resin, or combinations thereof.

An embodiment of the present disclosure provides a display panel, including a first substrate, a surface of the first substrate is provided with a plurality of convex electrodes spaced apart from each other in a bonding region; and a second substrate disposed opposite to the first substrate, and a surface of the second substrate is provided with a plurality of pins spaced apart from each other on the bonding region, the plurality of pins disposed in one-to-one correspondence with the plurality of convex electrodes; wherein, the first substrate and the second substrate are bonded by the anisotropic conductive film, and each of the convex electrodes and the corresponding pin are filled with conductive particles, the conductive particles comprising a covalent organic framework material, the covalent organic framework material comprising PyVg-COF.

Further, the first substrate is a panel substrate, and the second substrate is a chip envelope substrate or a flexible printed circuit substrate.

An embodiment of the present disclosure provides a method of manufacturing a display panel, includes:

providing a first substrate, a surface of the first substrate is provided with a plurality of convex electrodes spaced apart from each other in a bonding region;

coating an anisotropic conductive film on the first substrate, and covering the plurality of convex electrodes with the anisotropic conductive film;

coupling the second substrate to the first substrate, the plurality of convex electrodes disposed in one-to-one correspondence with the plurality of pins; and bonding the first substrate to the second substrate.

Further, the convex electrode is formed on the first substrate by coating or pasting.

Further, bonding the first substrate to the second substrate comprises: holding the first substrate and the second substrate in a state of being pressed against each other by a hot plate, dissolving the anisotropic conductive film and volatilizing the solvent therein, and after cooling and curing, the conductive particle respectively in contact with the convex electrode and the pin.

The beneficial effects of the present disclosure are: the present disclosure relates to an anisotropic conductive film for bonding, a display panel, and manufacturing method thereof, the conductive particles of the covalent organic frame material replace the existing gold ball as an anisotropic conductive film for bonding, thereby saving the manufacturing cost of the gold ball, improving the conductivity and water resistance, and avoiding the bonding contact point being oxidation.

DETAILED DESCRIPTION OF PREFERRED EMBODIMENTS

Figure 1:
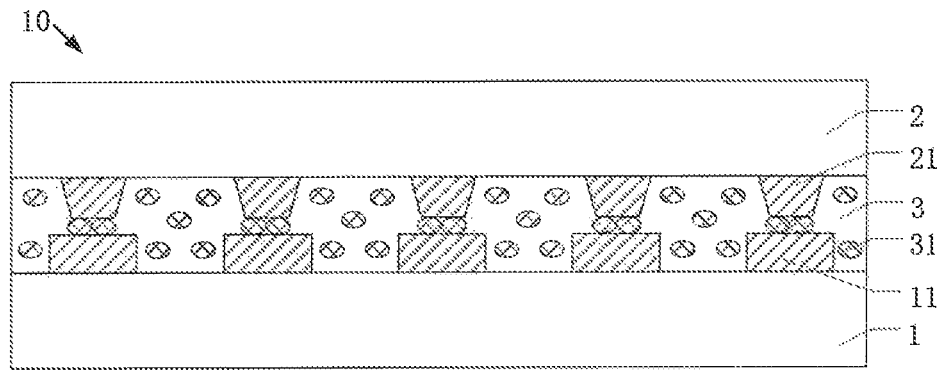
FIG. 1 shows a structural schematic diagram of a display panel according an embodiment of the present disclosure.

The preferred embodiments of the present disclosure are described in detail below with reference to the accompanying drawings. Those skilled in the art will more readily understand how to implement the present disclosure. However, the present disclosure maybe embodied in many different types of embodiments, and the protective scope of the present disclosure is not limited to the embodiments described herein.

An embodiment of the present disclosure provides an anisotropic conductive film, includes a conductive particle, the conductive particle including a covalent organic framework material, the covalent organic framework material including PyVg-COF. Covalent organic frameworks (COFs) are a class of structurally crystalline organic porous polymers with dynamic covalent bonds for construction, the COFs has the characteristics of low density, high specific surface and precise adjustable hole size.

In this embodiment, the covalent organic framework material is PyVg-COF, and structural formula of PyVg-COF is as follows:

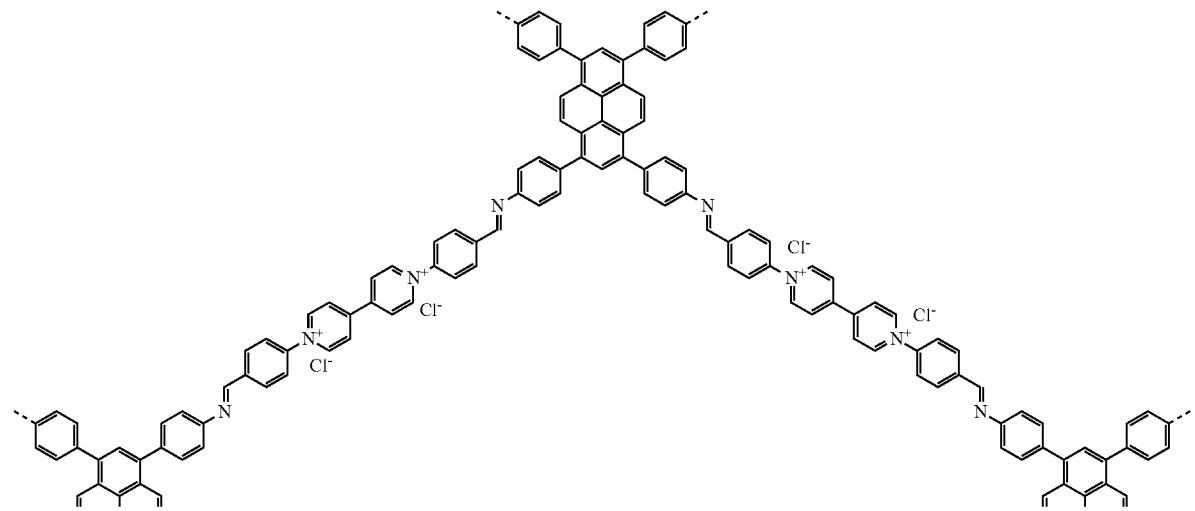

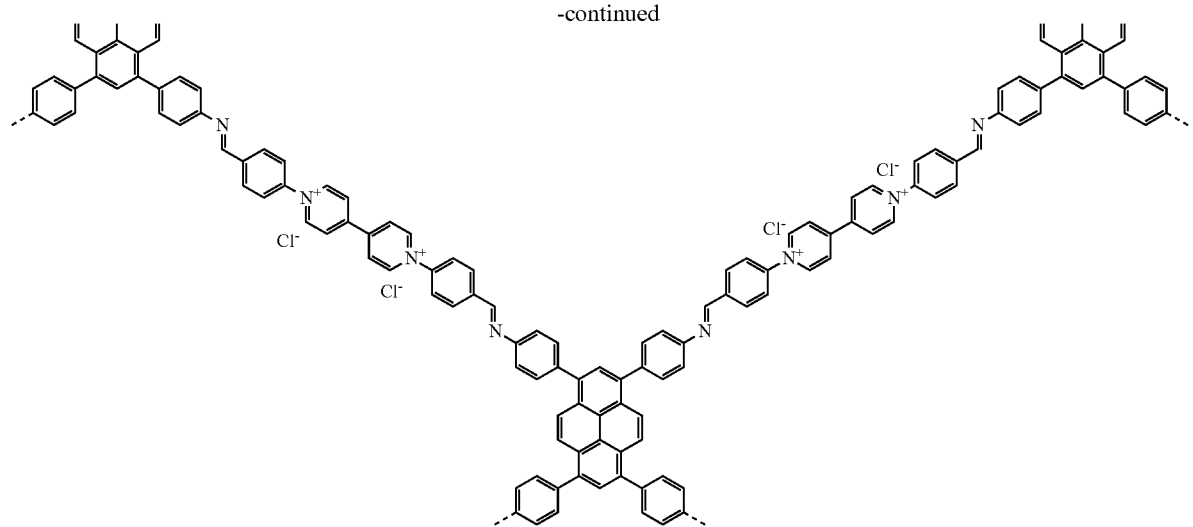

The PyVg-COF framework has characteristic of highly charged and thus can be used as a conductive material. This embodiment also utilizes this feature, using the conductive particles of covalent organic framework material instead of the existing gold balls as an anisotropic conductive film for bonding, thereby saving the manufacturing cost of the gold ball, improving the conductivity and water resistance, and avoiding the bonding contact point being oxidation.

In this embodiment, the PyVg-COF is composed of reaction of 1,3,6,8-tetra-(p-aminophenyl)-indole (Py) and 1,1-bis(4-formylphenyl)-4,4'dipyridinium dichloride ($Vg^{2+} \cdot 2Cl^-$), the reaction temperature is 120° C.; wherein the structural formula of Py is:

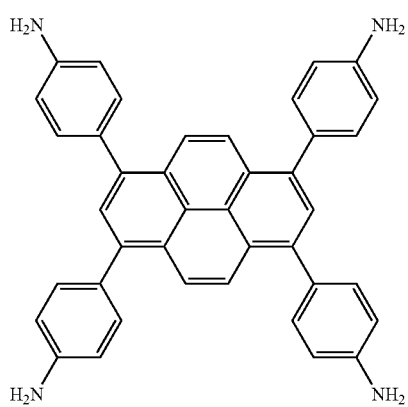 [SMILES: Nc1ccc(-c2cc(-c3ccc(N)cc3)c3ccc4c(-c5ccc(N)cc5)cc(-c5ccc(N)cc5)c5ccc2c3c54)cc1]

The structural formula of the $Vg^{2+} \cdot 2Cl$ is:

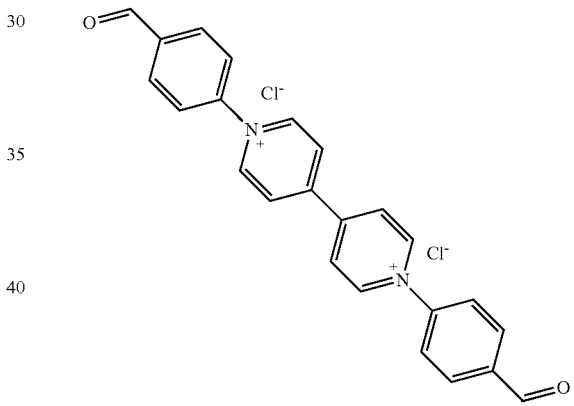

In this embodiment, two kinds of constituting monomers Py and $Vg^{2+} \cdot 2Cl-$ having opposite properties are used to regulate the crystallinity of the PyVg-COF. The monomer Py exhibits a strong π-π interaction and is easy to form a crystalline stacked structure; the monomer $Vg^{2+} \cdot 2Cl-$ generates a strong electric repulsive force due to a high charge density, suppressing the formation of an alternate stacked structure. The PyVg-COF material exhibits remarkable crystallinity and is very soluble in various organic solvents; it forms a true solution after dissolution, and overcomes interlayer interaction by itself to cause dissociation between layers. It exists in the form of large-area single-layer or multi-layer nanosheets. Benefit from the good solubility of the PyVg-COF in an organic solvent, the PyVg-COF solution may be dropped onto a substrate material (both a conductor and an insulator) to form a film.

The PyVg-COF is a network polymer obtained by polycondensation reaction of Py and $Vg^{2+} \cdot 2Cl-$ under solvothermal conditions (temperature: 120° C.). The chemical formula of the Py and $Vg^{2+} \cdot 2Cl-$ reactions is generally:

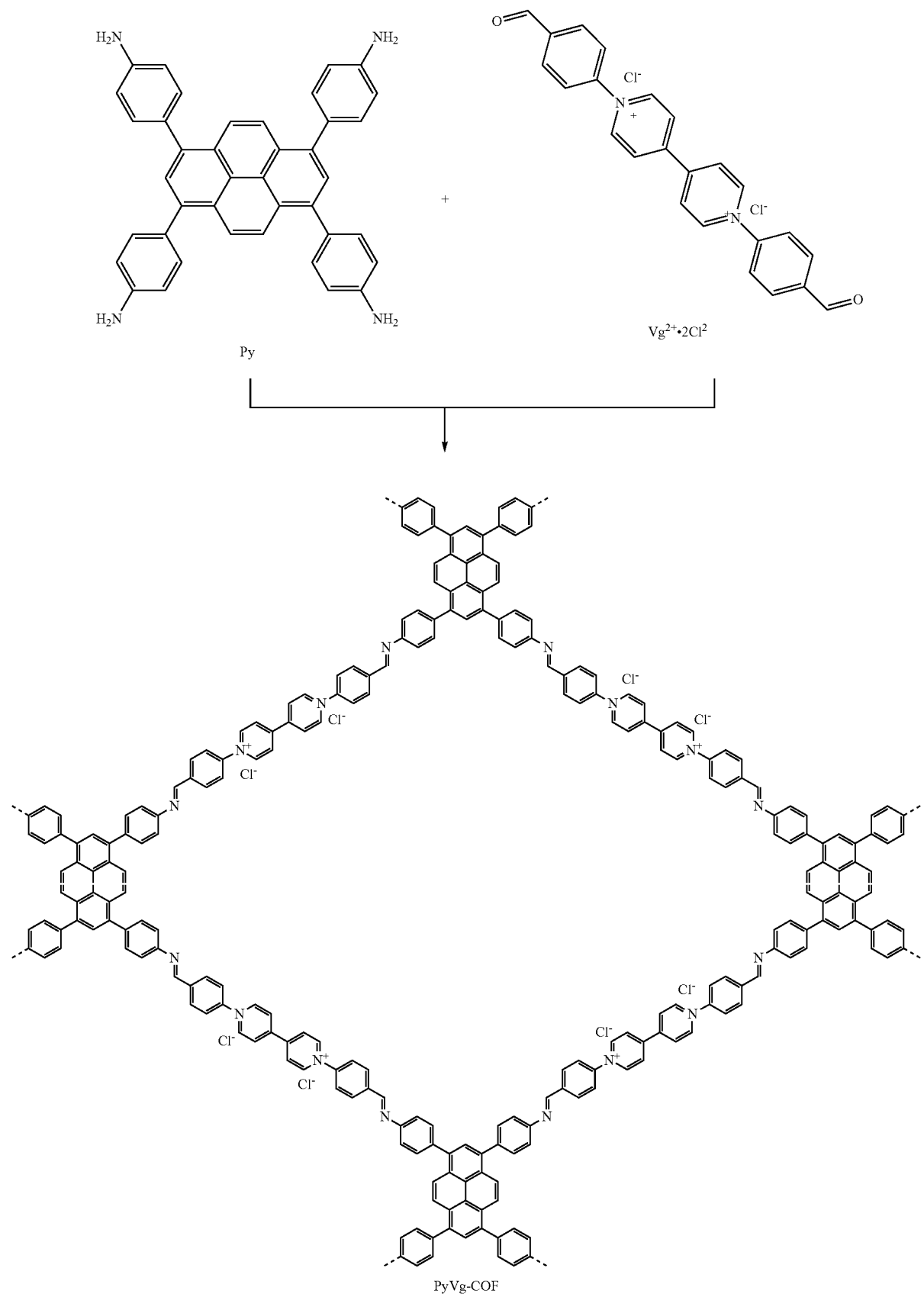

In this embodiment, the anisotropic conductive film further includes a solvent, a binder, and an additive.

More specifically, the composition and content of the anisotropic conductive film are: the conductive particles, 20%-40%; the solvent, 50%-70%; the adhesive, 3%-5%; and the additive, 2% to 5%; wherein all percentages are by weight.

In this embodiment, the solvent includes poly(methyl methacrylate) (PMMA), dimethylacetamide (DMAC), pyrrolidone(NMP), N,N-diethyl formamide(DEF), dimethyl sulfoxide(DMSO), or combinations thereof.

In this embodiment, the binder comprises a vinyl acetate resin, an acrylic resin, an epoxy resin, or combinations thereof.

In this embodiment, the additive is an azole compound, including benzotriazole, 1H-imidazole, 1H-tetrazole, 5-phenyl-1H-tetrazole, 5-amino-1H-tetrazole, 3-amino-1H-triazole, 5-carboxybenzotriazole or combinations thereof.

As shown in FIG. 1, an embodiment of the present disclosure provides a display panel 10 including a first substrate 1, a second substrate 2, and the anisotropic conductive film 3. Specifically, a plurality of convex electrodes 11 spaced apart from each other in a bonding region; and the second substrate 2 disposed opposite to the first substrate 1, and a surface of the second substrate 2 is provided with a plurality of pins 21 spaced apart from each other on the bonding region, the plurality of pins 21 disposed in one-to-one correspondence with the plurality of convex electrodes 11; wherein, the first substrate 1 and the second substrate 2 are bonded by the anisotropic conductive film 3, and each of the convex electrodes 11 and the corresponding pin 21 are filled with conductive particles 31, the conductive particles 31 including a covalent organic framework material, the covalent organic framework material including PyVg-COF.

In this embodiment, the first substrate 1 is a panel substrate, and the second substrate 2 is a chip envelope substrate or a flexible printed circuit substrate.

Figure 2:
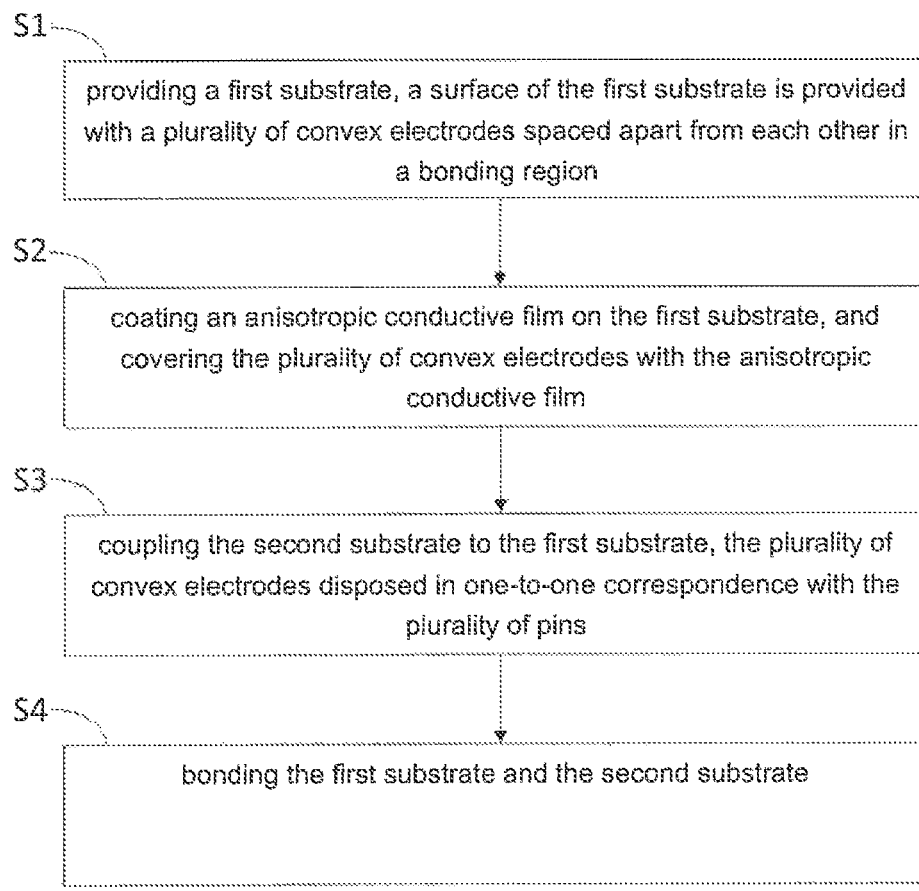
FIG. 2 shows a flowchart of a method of manufacturing the display panel according an embodiment of the present disclosure.

As shown in FIG. 2, an embodiment of the present disclosure provides a method of manufacturing the display panel 10, including the following steps:

S1: providing a first substrate 1, a surface of the first substrate 1 is provided with a plurality of convex electrodes 11 spaced apart from each other in a bonding region.

S2: coating an anisotropic conductive film 3 on the first substrate 1, and covering the plurality of convex electrodes 11 with the anisotropic conductive film 3; more specifically, the PyVg-COF film is formed by a solution method under an electric field to form the anisotropic conductive film 3;

S3: coupling the second substrate 2 to the first substrate 1, the plurality of convex electrodes 11 disposed in one-to-one correspondence with the plurality of pins 21;

S4: bonding the first substrate 1 and the second substrate 2.

In this embodiment, the convex electrode 11 is formed on the first substrate 1 by coating or pasting.

In this embodiment, wherein the step S4 of bonding the first substrate 1 to the second substrate 2 includes: holding the first substrate 1 and the second substrate 2 in a state of being pressed against each other by a hot plate, dissolving the anisotropic conductive film 3 and volatilizing the solvent therein, and after cooling and curing, the conductive particle 31 respectively in contact with the convex electrode 11 and the pin 12. And bonding the anisotropic conductive adhesive film 3 to the first substrate 1 and the second substrate 2, the anisotropic conductive adhesive film 3 fills the gap between the first substrate 1 and the second substrate 2 to be insulated to form a bonding structure of the display panel 10.

The beneficial effects of the present disclosure are: the present disclosure relates to an anisotropic conductive film 3 for bonding, a display panel, and manufacturing method thereof, the conductive particles 31 of the covalent organic frame material replace the existing gold ball as an anisotropic conductive film 3 for bonding, thereby saving the manufacturing cost of the gold ball, improving the conductivity and water resistance, and avoiding the bonding contact point being oxidation.

The anisotropic conductive film provided by the present disclosure has been described in detail above. It is understood that the exemplary embodiments described herein are to be considered as illustrative only, and are not intended to limit the invention. Descriptions of features or aspects in each exemplary embodiment should generally be considered as suitable features or aspects in other exemplary embodiments. While the invention has been described with reference to the preferred embodiments thereof, various modifications and changes can be made by those skilled in the art. The present disclosure is intended to cover such modifications and variations within the scope of the appended claims, and any modifications, equivalents, and modifications within the spirit and scope of the present disclosure are intended to be included within the scope of the present disclosure.

What is claimed is:

1. An anisotropic conductive film, comprising:
   a conductive particle, the conductive particle comprising a covalent organic framework material, the covalent organic framework material comprising PyVg-COF;
   wherein the anisotropic conductive film further comprises a solvent, a binder, and an additive; and
   wherein percentages by weight of the composition and content of the anisotropic conductive film are: the conductive particles, 20% to 40%; the solvent, 50% to 70%; the adhesive, 3% to 5%;
   and the additive, 2% to 5%.

2. The anisotropic conductive film as claimed in claim 1, wherein the covalent organic framework material is PyVg-COF, and structural formula of PyVg-COF is as follows:

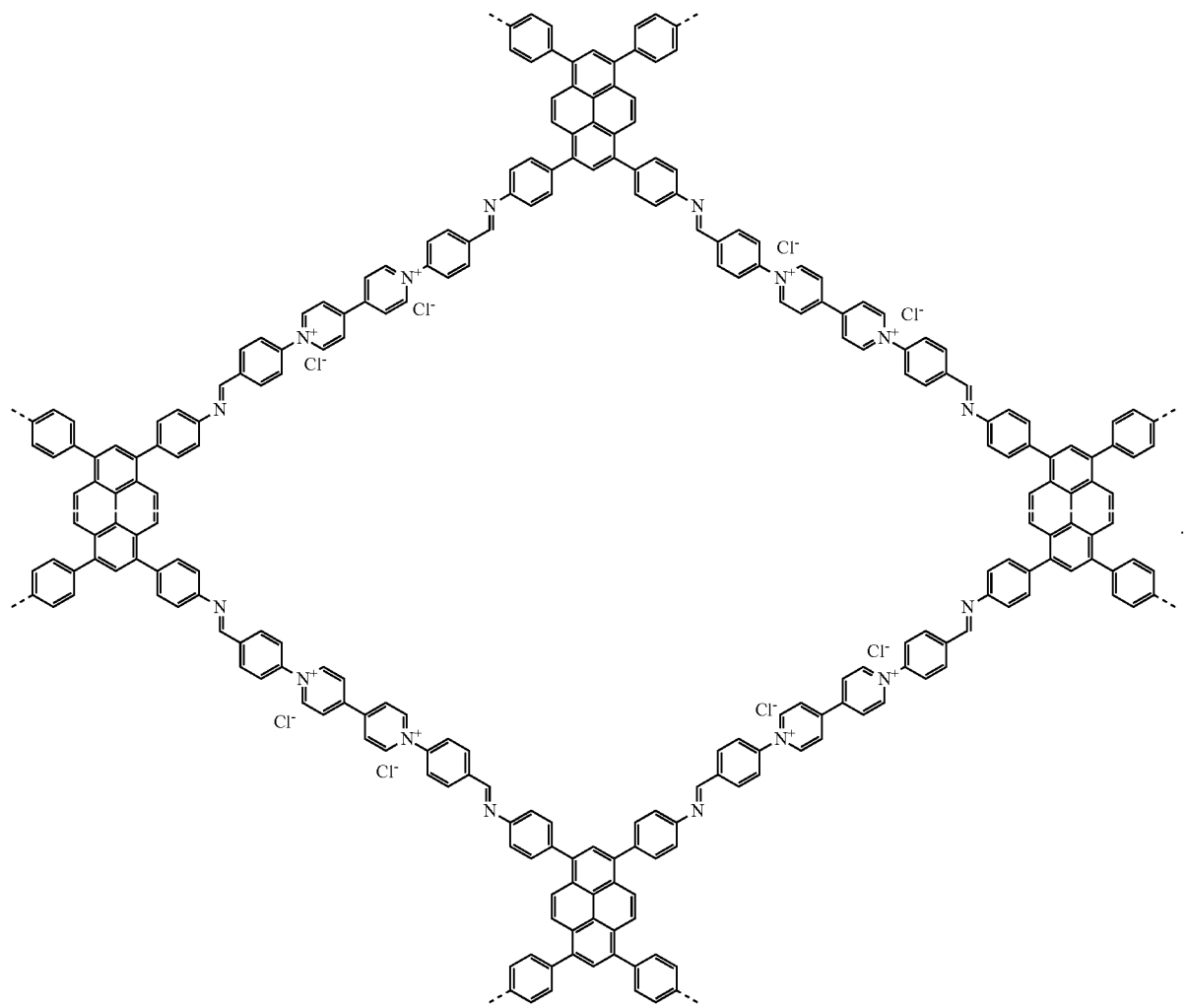

3. The anisotropic conductive film as claimed in claim 1, wherein the solvent comprises poly(methyl methacrylate), dimethylacetamide, pyrrolidone, N,N-diethyl formamide, dimethyl sulfoxide, or combinations thereof.

4. The anisotropic conductive film as claimed in claim 1, wherein the binder comprises a vinyl acetate resin, an acrylic resin, an epoxide resin, or combinations thereof.

5. A display panel, comprising:
   a first substrate, a surface of the first substrate provided with a plurality of convex electrodes spaced apart from each other in a bonding region; and
   a second substrate disposed opposite to the first substrate, and a surface of the second substrate provided with a plurality of pins spaced apart from each other on the bonding region, the plurality of pins disposed in one-to-one correspondence with the plurality of convex electrodes;
   wherein the first substrate and the second substrate are bonded by the anisotropic conductive film as claimed in claim 1, and each of the convex electrodes and the corresponding pin are filled with conductive particles, the conductive particles comprising a covalent organic framework material, the covalent organic framework material comprising PyVg-COF.

6. The display panel as claimed in claim 5, wherein the first substrate is a panel substrate, and the second substrate is a chip envelope substrate or a flexible printed circuit substrate.

7. A method of manufacturing a display panel, comprises:
   providing a first substrate, a surface of the first substrate is provided with a plurality of convex electrodes spaced apart from each other in a bonding region;
   coating the anisotropic conductive film as claimed in claim 1 on the first substrate, and covering the plurality of convex electrodes with the anisotropic conductive film;
   coupling the second substrate to the first substrate, the plurality of convex electrodes disposed in one-to-one correspondence with the plurality of pins; and
   bonding the first substrate to the second substrate.

8. A method of manufacturing the display panel as claimed in claim 7, wherein the convex electrode is formed on the first substrate by coating or pasting.

9. A method of manufacturing the display panel as claimed in claim 7, wherein bonding the first substrate to the second substrate comprises:
   holding the first substrate and the second substrate in a state of being pressed against each other by a hot plate, dissolving the anisotropic conductive film and volatilizing the solvent therein, and after cooling and curing, the conductive particle respectively in contact with the convex electrode and the pin.

\* \* \* \* \*